United States Patent
Seger et al.

(10) Patent No.: US 8,928,166 B2
(45) Date of Patent: Jan. 6, 2015

(54) MIXED MODE POWER GENERATION ARCHITECTURE

(75) Inventors: Mark J. Seger, Rockford, IL (US);
Todd A. Spierling, Byron, IL (US);
David S. Behling, Belvidere, IL (US);
Craig R. LeGros, Rockford, IL (US);
Brandon M. Grell, Cherry Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 531 days.

(21) Appl. No.: 13/222,395

(22) Filed: Aug. 31, 2011

(65) Prior Publication Data
US 2013/0049366 A1    Feb. 28, 2013

(51) Int. Cl.
| F02N 11/04 | (2006.01) |
| H02K 23/52 | (2006.01) |
| H02P 9/04 | (2006.01) |
| F01D 15/10 | (2006.01) |
| H02P 11/00 | (2006.01) |
| H02H 7/06 | (2006.01) |

(52) U.S. Cl.
CPC ........ *F01D 15/10* (2013.01); *F05D 2220/7642* (2013.01); *B64D 2221/00* (2013.01); *F05D 2220/768* (2013.01); *F05D 2260/85* (2013.01); *Y02T 50/671* (2013.01)
USPC ................... 290/46; 322/25; 322/28; 322/29

(58) Field of Classification Search
USPC .................................. 290/46; 322/25, 28, 29
See application file for complete search history.

(56) References Cited

U.S. PATENT DOCUMENTS

| 4,382,188 | A  * | 5/1983 | Cronin ........................ 290/1 C |
| 4,401,938 | A  * | 8/1983 | Cronin ........................... 322/29 |
| 4,447,737 | A  * | 5/1984 | Cronin ............................ 290/6 |
| 4,456,830 | A  * | 6/1984 | Cronin .......................... 290/27 |
| 7,690,186 | B2 * | 4/2010 | Dooley ...................... 60/39.511 |
| 7,990,112 | B2 * | 8/2011 | Santhirahasan et al. ........ 322/28 |
| 8,575,900 | B2 * | 11/2013 | Spierling ........................ 322/34 |
| 8,773,101 | B2 * | 7/2014 | Krenz et al. .................. 323/285 |
| 8,836,293 | B1 * | 9/2014 | Rozman et al. ................. 322/25 |
| 2009/0007569 | A1 * | 1/2009 | Lemmers, Jr. et al. .......... 60/792 |
| 2013/0033246 | A1 * | 2/2013 | Krenz et al. .................. 323/282 |
| 2014/0197681 | A1 * | 7/2014 | Iwashima et al. .............. 307/9.1 |
| 2014/0202170 | A1 * | 7/2014 | Cook, III ........................ 60/805 |
| 2014/0266077 | A1 * | 9/2014 | Rozman et al. ................. 322/25 |
| 2014/0266078 | A1 * | 9/2014 | Rozman et al. ................. 322/27 |
| 2014/0266079 | A1 * | 9/2014 | Rozman et al. ................. 322/28 |

* cited by examiner

*Primary Examiner* — Pedro J Cuevas
(74) *Attorney, Agent, or Firm* — Kinney & Lange, P.A.

(57) ABSTRACT

An electric power generation system (EPGS) employs both a wild-source generator and a variable and/or constant frequency generator. The wild-source generator is coupled to receive mechanical power from a low-pressure spool on an aircraft engine and to generate in response a wild-source output for consumption by voltage and frequency-tolerant loads. The variable and/or constant frequency generator is coupled to receive mechanical power from a high-pressure spool on the aircraft engine and to generate in response a variable and/or constant frequency output for consumption by voltage and frequency-intolerant loads.

9 Claims, 1 Drawing Sheet

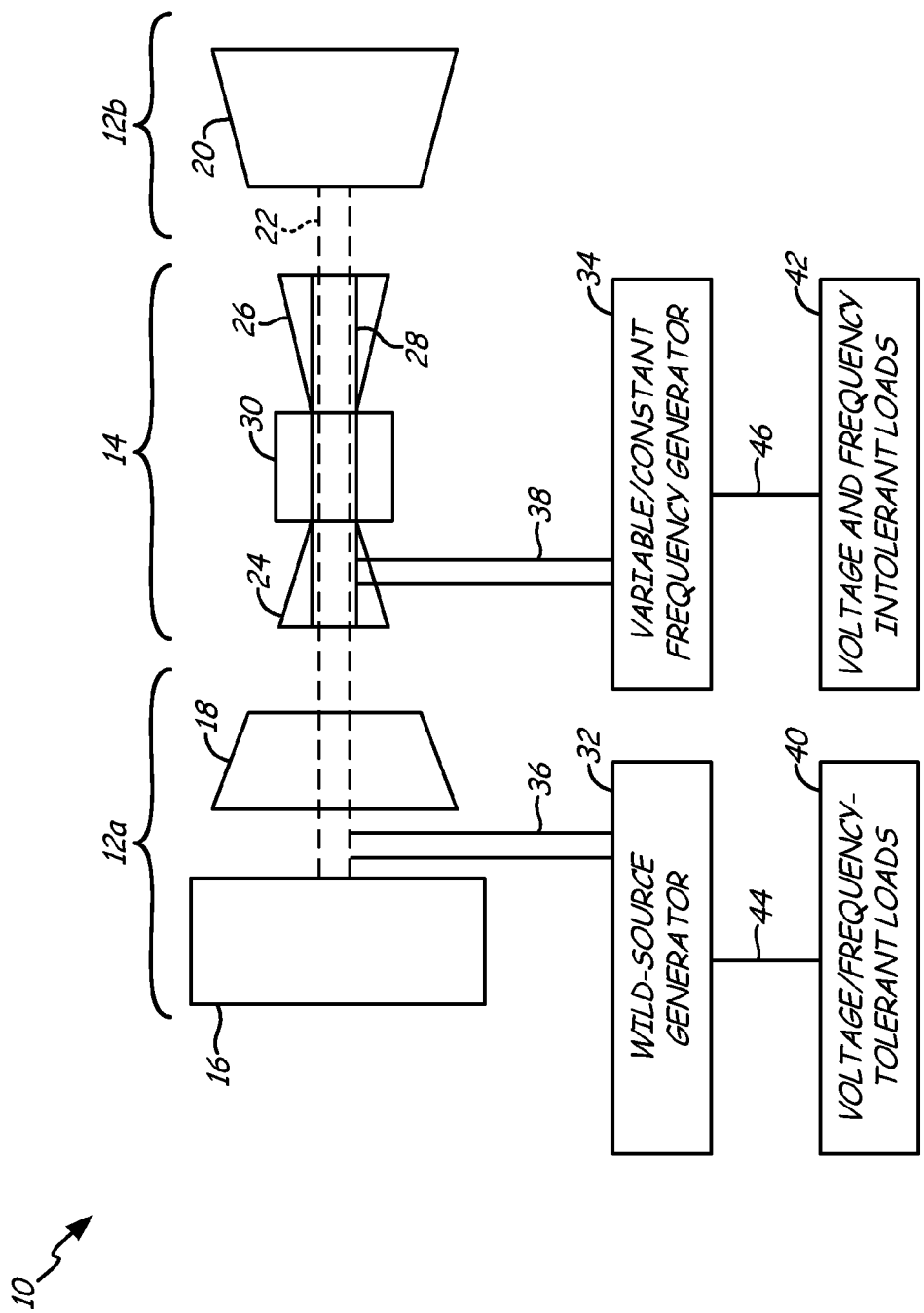

MIXED MODE POWER GENERATION ARCHITECTURE

BACKGROUND

The present invention is related to electric power generation systems (EPGSs).

In aircraft applications, electric power generation is derived, in large part, from mechanical power supplied by the aircraft's engines, which is converted to alternating current (AC) electric power by a generator. Variations in aircraft engine speed result in variation in the output voltage and frequency produced by the generator. However, some loads are sensitive to variations in voltage and frequency, and therefore most generators employed on modern-day aircraft provide regulated output voltage and either a constant output frequency or a variable frequency within a defined range that is acceptable to attached loads. For example, constant frequency generators use mechanical couplings to provide a constant-frequency AC output despite variations in engine speed. However, the mechanical couplings add to the cost and weight of the generator. Variable-frequency generators are an alternative to constant frequency generators, but must still be capable of providing an AC output within a well-defined range (e.g., 350 Hz-800 Hz). This requirement also adds to the weight and cost of variable-frequency generators. Regulating generator output voltage is done using generator field control or power conversion electronics, both of which add cost and weight to the power generation system.

A less expensive alternative to regulated voltage, constant-frequency and variable-frequency generators is a wild-source generator that provides a variable-voltage, variable frequency AC output, typically with output frequency ranges greater than that seen in variable-voltage generators. Traditionally, wild-source generators have not found applicability in aircraft applications because of their inability to provide the type of high-quality power (i.e., stable frequency) required by most loads on the aircraft.

SUMMARY

An electric power generation system (EPGS) employs both a wild-source generator and a regulated voltage generator that produces either variable or constant frequency. The wild-source generator is coupled to receive mechanical power from a low-pressure spool on an aircraft engine and to generate in response a wild-source output for consumption by frequency and voltage tolerant loads. The regulated voltage generator with variable and/or constant frequency output is coupled to receive mechanical power from a high-pressure spool on the aircraft engine and to generate in response a regulated voltage with variable and/or constant frequency output for consumption by voltage and frequency intolerant loads.

BRIEF DESCRIPTION OF THE DRAWINGS

The FIGURE is a functional block diagram of a mixed-mode electric power generation system (EPGS) according to an embodiment of the present invention.

DETAILED DESCRIPTION

The present invention provides a mixed-mode electric power generator system (EPGS) that utilizes wild-source generators to generate power for voltage and frequency tolerant loads. A benefit of the present invention is loads having lower power quality requirements (i.e., voltage and frequency tolerant loads) can be sourced with power generated by the wild-source generator, which is typically lower in weight and therefore less expensive than variable/constant frequency generators.

The FIGURE is a functional block diagram of mixed-mode electric power generation system (EPGS) according to an embodiment of the present invention. The mixed-mode EPGS derives power from aircraft engine 10, which includes low-pressure (LP) spool 12 (illustrated as fore portion 12*a* and aft portion 12*b*), and high-pressure (HP) spool 14. LP spool 12 includes fan 16, LP compressor 18 and LP turbine 20, all connected via LP shaft 22. HP spool 14 includes HP compressor 24 and HP turbine 26, connected via HP shaft 28. Combustor 30 is located between HP compressor 24 and HP turbine 26. The mixed-mode EPGS includes wild-source generator 32 and variable and/or constant frequency generator 34.

High-pressure (HP) spool 14 is located in the interior portion of the engine, and includes HP compressor 24 and HP turbine 26 connected to one another by HP shaft 28. When rotated, HP compressor 24 compresses air and forces it into combustor 30, thereby creating a gas path flowing from fore to aft through combustor 30. In combustor 30, the compressed air provided by HP compressor 24 is mixed with fuel and ignited to create thrust. HP turbine 26 extracts energy from the combustor (i.e., from the expanding gas) and communicates the extracted energy via HP shaft 28 to HP compressor 24, thereby maintaining the flow of compressed air into combustor 30 such that engine 10 is self-sustaining (once started).

Low-pressure spool 12 includes elements located on either side (i.e., fore and aft) of HP spool 14, including a fan 16, LP compressor 18 and LP turbine 20 connected to one another via LP shaft 22. Energy generated by combustion within aircraft engine 10 is extracted by LP turbine 20 and communicated to LP compressor 18 and fan 16 via LP shaft 22, which in response supply airflow into HP compressor 24. Components on LP spool 12 are larger (i.e., greater in diameter) than components on HP spool 14, and rotate at speeds much slower and more variable than counterparts on HP spool 14.

Traditionally, generators are connected to the HP spool for several reasons. The speed of the HP spool is less variable than that of the LP spool and therefore generators associated with the HP spool provide a more consistent output frequency or require fewer speed-control measures to provide a desired output frequency. In addition, in many aircraft engines, the HP spool must be rotated in order to generate the gas path required to start the engine. If the generator is also being used as a starter motor, then it must be connected to the HP spool for engine starting operations.

The present invention takes advantage of the fact that not all loads on an aircraft require high-quality power (i.e., regulated voltage with constant or controlled frequency). In the embodiment shown in the FIGURE, voltage and frequency-tolerant loads 40 are those loads that do not require tightly controlled voltages and/or frequencies. In general, voltage and frequency-tolerant loads 40 are resistive loads (i.e., loads that do not contain capacitive or inductive elements). In aircraft applications, voltage and frequency-tolerant loads may include resistive heaters employed in de-icers. Wild-source generator 32 provides a wild-source output to voltage and frequency-tolerant loads 40 via electric distribution bus 44, while variable/constant frequency generator 34 generates higher-quality power for consumption by high-quality, wild-source intolerant or frequency-intolerant loads 42 via electric distribution bus 46.

In the embodiment shown in the FIGURE, motive power generated by low-pressure spool 12 is communicated via LP tower shaft 36 to wild-source generator 32. In other embodiments, other well-known means of communicating power to wild-source generator 32 may be employed. For example, wild-source generator 32 may receive mechanical energy via a direct drive from the shaft (not shown) of low-pressure spool 12, may be mounted around low-pressure spool 12 in which the shaft of the spool serves as either the stator or the rotor of the wild-source generator, via mechanical gearbox coupling, or other well-known means. Similarly, motive power generated by HP spool 14 is communicated by HP tower shaft 38 to variable/constant frequency generator 34. Once again, in other embodiments other well-known means of communicating mechanical energy to variable/constant frequency generator 34 may be employed.

Depending on the application, wild-source generator 32 may be implemented as a permanent magnet generator (PMG), a wound-field synchronous generator, or other well-known generator topologies. However, because the output of wild-source generator 32 is provided to voltage and frequency tolerant loads, the generator does not require voltage regulation, speed compensation or other mechanisms for providing a high-quality (i.e., regulated voltage, consistent frequency) output. As a result, the cost and/or weight of wild-source generator 32 is less than that of other generators connected to extract power from low-pressure spool 12.

Wild-source generator 32 converts mechanical energy supplied by low-pressure spool 12 to a variable frequency, variable voltage AC output for distribution to voltage and frequency tolerant loads 40 via electrical distribution bus 44. Wild-source generator 32 is referred to as "wild" due to the range of frequencies and/or voltages generated by the generator, which can be defined as a voltage and/or frequency range that is greater than the voltage and frequency range associated with variable-frequency generators. For example, various specifications (e.g., military specification MIL-STD-704F) define the maximum allowable range of voltage and frequencies that may be generated by a variable-frequency generator. A generator providing a voltage and/or frequency range greater than that defined with respect to variable-frequency generators is classified as a wild-source generator. In one embodiment, variable-frequency generators provide an AC output in the frequency range of 350 Hz-800 Hz. A wild-source generator would therefore provide an AC output in a frequency range greater than that defined with respect to the variable-frequency generator.

In this way, the present invention employs both wild-source generators and variable/constant frequency generators to meet the power requirements of an aircraft. A benefit of this arrangement is wild-source generators are typically less expensive (in terms of weight) than variable and/or constant frequency generators. It is therefore efficient to source frequency-tolerant loads with power from the cost-efficient wild-source generator.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electric power generation system (EPGS) comprising:
   a wild-source generator coupled to receive mechanical power from a low-pressure spool on an aircraft engine and to generate in response a wild-source output for consumption by voltage and frequency-tolerant loads, wherein the wild-source output is voltage unregulated and speed unregulated; and
   a variable-frequency and/or constant frequency generator with regulated voltage output coupled to receive mechanical power from a high-pressure spool on the aircraft engine and to generate in response a variable and/or constant frequency output for consumption by voltage and frequency-intolerant loads.

2. The EPGS of claim 1, wherein the wild-source generator is a permanent magnet generator (PGM).

3. The EPGS of claim 1, wherein the wild-source generator is a wound-field synchronous machine.

4. The EPGS of claim 1, wherein the variable frequency generator is a starter motor coupled to provide mechanical energy to the high-pressure spool to start the aircraft engine.

5. An electrical power generation and distribution system (EPGDS) comprising:
   an aircraft engine having a low-pressure spool and a high-pressure spool;
   a wild-source generator coupled to receive mechanical power from the low-pressure spool and to generate in response a wild-source output that is voltage unregulated and speed unregulated;
   a variable-frequency and/or constant frequency generator coupled to receive mechanical power from the high-pressure spool and to generate in response a regulated voltage output with variable/constant frequency;
   at least one voltage and/or frequency-tolerant load connected to receive the wild-source output generated by the wild-source generator; and
   at least one wild-source intolerant load connected to receive the regulated voltage with variable/constant frequency output generated by the variable-frequency and/or constant frequency generator.

6. The EPGDS of claim 5, wherein the wild-source generator is a permanent magnet generator (PGM).

7. The EPGDS of claim 5, wherein the wild-source generator is a wound-field synchronous machine.

8. The EPGDS of claim 5, wherein the variable frequency generator is a starter motor coupled to provide mechanical energy to the high-pressure spool to start the aircraft engine.

9. The EPGDS of claim 5, wherein the frequency-tolerant load is a resistive load.

* * * * *